United States Patent

[11] 3,556,427

| [72] | Inventor | Jean-Paul Lemery<br>Cluses, France |
|---|---|---|
| [21] | Appl. No. | 769,849 |
| [22] | Filed | Oct. 23, 1968 |
| [45] | Patented | Jan. 19, 1971 |
| [73] | Assignee | Ets Carpano & Pons<br>Cluses, France<br>a French Company |
| [32] | Priority | Oct. 25, 1967 |
| [33] | | France |
| [31] | | 125720 |

[54] FISHING REEL
4 Claims, 2 Drawing Figs.

[52] U.S. Cl. .................................................. 242/84.1
[51] Int. Cl. .................................................... A01k 89/00
[50] Field of Search .......................................... 242/84.1,
84.2, 84.54; 43/21

[56] References Cited
UNITED STATES PATENTS

| 1,469,649 | 10/1923 | Sinkula et al. ................ | 242/84.1 |
| 2,327,431 | 8/1943 | Jicha ............................ | 242/84.1 |
| 2,706,096 | 4/1955 | Rufle ........................... | 242/84.2UX |

*Primary Examiner*—Billy S. Taylor
*Attorneys*—Robert E. Burns and Emmanuel J. Lobato ABSTRACT: In a winding drum for a fishing reel, a line spool is rotatably mounted between two flanges, one of which carries the crank for manually winding the spool, while the other flange has an extending member by which the reel can be supported against one arm of the fisherman, thereby permitting adequate support of the rod, and preventing the rod and reel from twisting as the crank is manipulated.

FISHING REEL

Deep sea fishing for example with a drag line often results in the catching of very large fish, as for example tuna, rays, and sharks of all kinds.

The weight, vitality and strength of such fish are such that the fisherman must use certain equipment, and a certain specialized technique. In fact a fish of this type and size, once caught, exerts such a pull on the line that the fisherman often must tie himself to the boat in order not to fall overboard, and this strain is additionally increased by rocking of the boat.

In order that the fisherman be able to bring his catch near the boat he must exert on the crank of his reel a very considerable effort, and this often for a long time.

The operation of the reel under these conditions leads the fisherman to exert the necessary force required to turn the crank, and also a force in the direction parallel to the axis of the spool which is compensated and canceled by the fisherman by resting the opposite side of the reel against his arm. But this support is far from being perfect because the position of the fisherman on his boat is never constant in such a way that the reel may slip on the arm against which it is supported, often causing injury to the fisherman or damage to his clothing. Furthermore, any loss of equilibrium, may cause the line to break, thereby allowing the fish to escape.

The object of the present invention is to avoid these drawbacks. An embodiment of the invention provides a winding drum fishing reel for a fishing line which comprises a spool of line rotatably mounted between two flanges integral with one another. One of the flanges carries the driving crank for the spool, and the improvement lies in the fact that the second flange has means for supporting the reel on the arm of the fisherman.

In a preferred embodiment of the invention, the side of the supporting member intended to be brought into contact with the arm of the user has a curvature which espouses the shape of the arm at least in the supporting zone thereof.

In an also equally advantageous embodiment of the invention, the support member has a beak which enables it to take hold of the arm carrying the rod in order to continue the support of the member on the arm even when the arm is raised while the arm actuating the crank generates a push in the contrary direction.

Other features and advantages of the winding drum reel of the invention will be indicated in the following description which refers to the accompanying drawings, which are given by way of nonlimiting example, and in which.

Figure 2:
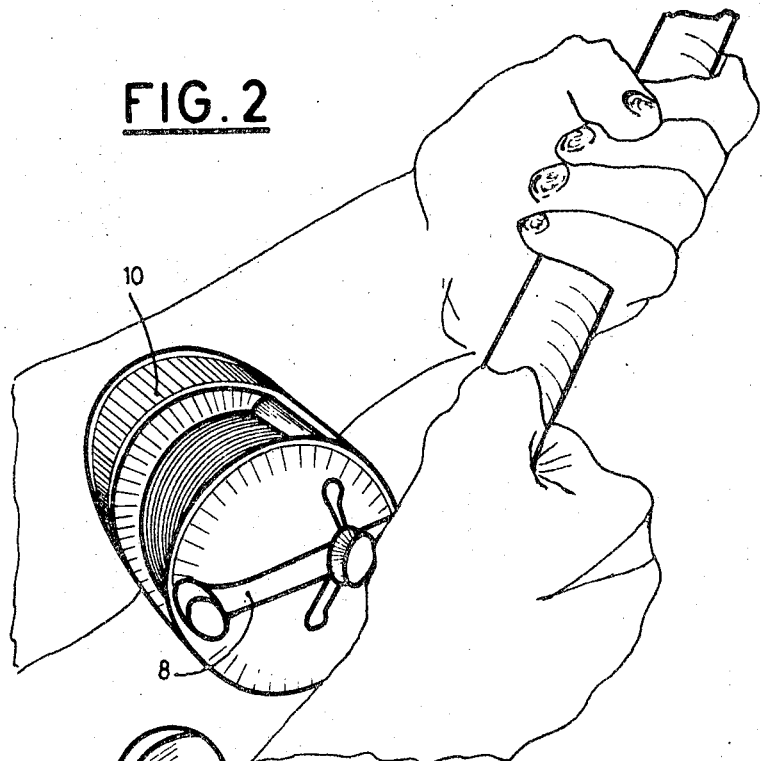
FIG. 2 shows the position of such a reel when the fisherman holds the fishing rod.
Figure 1:
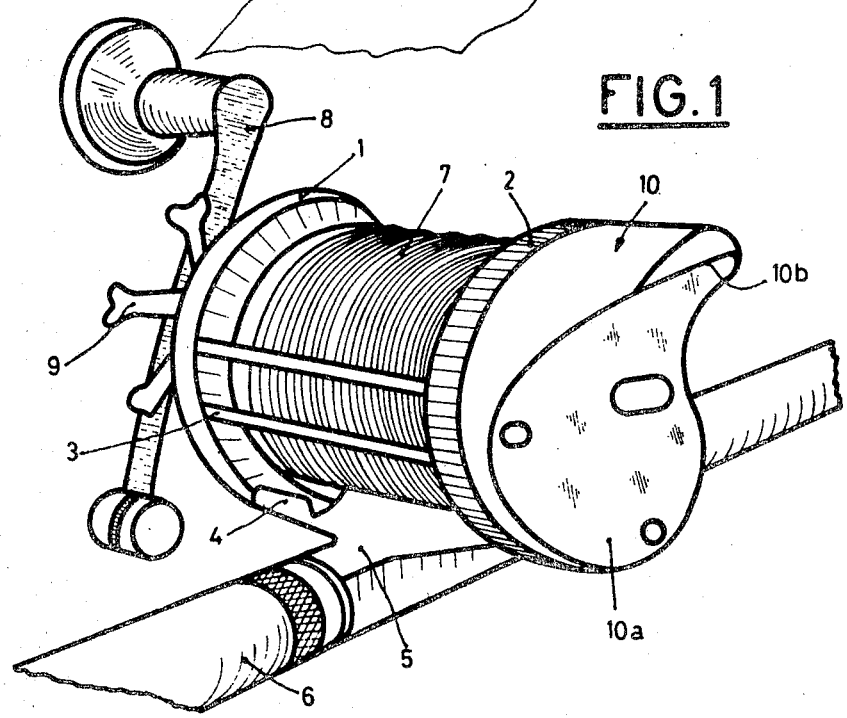
FIG. 1 is a perspective view of a reel winding embodying the invention.

The reel-winding drum according to the invention comprises a frame constituted by two flanges 1 and 2 united by cross pieces such as 3 and by a crossmember 4 carrying two fasteners to a rod 6 which are diametrically opposite and of which only one side 5 is partially visible in the drawing.

Between these flanges is pivotally mounted a spool 7 for the line of the rod, and the spool is driven by manual rotation of a crank 8 secured to flange 1 and connected to the spool through a multiplying gear train, now shown, contained in this flange 1.

The brake for controlling the unwinding of the line from spool 7, for example under the urging of an excessive pull generated on the line by the fish, is also placed in flange 1 and the corresponding braking force can be adjusted by turning the starred rag 9.

While fishing, in particular when the fisherman desires to reel in a catch, he handles the rod and the reel as shown in FIG. 2. That is, he holds the fishing rod in his left hand and actuates the crank 8 of the reel with his right hand. It should be noted that the effort which must be exerted on this crank by the right arm can be very considerable in particular when the catch is big and fights hard or when the sea is relatively agitated.

Under these conditions the fisherman also pushes with his right arm towards the left arm and in so doing supports the reel with this arm.

Such support is facilitated with the reel of the invention by the fact that flange 2 of the reel has a support base 10 which can be recessed on this flange or on the contrary can form a single piece therewith. The side 10a the support base 10 has a shape which is curved to engage against the user's arm over a large area, the reel.

In particular this base has at its upper part a beak 10b which enables it to take hold of the upper part of the arm holding the rod when it is in the position shown in FIG. 2, in particular in order to maintain this support even when the arm is raised, for example to oppose the pull exerted on the line by the fish while the arm which actuates the crank generates a push in the opposite direction.

The base 1 can be made of any suitable material such as wood, foamed plastic, aluminum or one of the alloys thereof.

The invention is naturally not limited to what has been described or shown and encompasses on the contrary all the modifications of shape and size thereof to which it may give rise.

I claim:

1. A fishing reel comprising a pair of interconnected flanges, a line spool rotatably mounted between said flanges, a crank carried by one of said by one of said flanges for rotating said spool, and support means on said other flange for supporting said reel against an arm of the user, wherein said means have a side intended to come into contact with said arm and which has a curvature corresponding to that of said arm.

2. A reel according to claim 1, wherein said curvature terminates in a beak portion adapted to contact the arm of the fisherman carrying a rod on which said reel is mounted in order to continue to support said reel even when the arm is raised.

3. A reel according to claim 1, wherein said means and said flange are integral.

4. A reel according to claim 1, wherein said means are recessed on said flange.